United States Patent
Brown

(10) Patent No.: US 6,809,451 B1
(45) Date of Patent: Oct. 26, 2004

(54) GALVANOMETER MOTOR WITH COMPOSITE ROTOR ASSEMBLY

(75) Inventor: David C. Brown, Northborough, MA (US)

(73) Assignee: GSI Lumonics Corporation, Billerica, MA (US)

( * ) Notice: Subject to any disclaimer, the term of this patent is extended or adjusted under 35 U.S.C. 154(b) by 0 days.

(21) Appl. No.: 10/218,287

(22) Filed: Aug. 14, 2002

(51) Int. Cl.$^7$ .............................................. H02K 21/12
(52) U.S. Cl. ............. 310/156.08; 310/156; 310/156.11; 310/154.31; 310/36
(58) Field of Search ...................... 310/156.08, 156.11, 310/36, 51

(56) References Cited

U.S. PATENT DOCUMENTS

| | | | |
|---|---|---|---|
| 1,271,441 A | * | 7/1918 | Dean |
| 4,076,998 A | | 2/1978 | Montagu ...................... 310/25 |
| 4,266,152 A | * | 5/1981 | Herr ............................ 310/59 |
| 4,533,891 A | | 8/1985 | Vanderlaan et al. |
| 5,105,139 A | * | 4/1992 | Lissack ....................... 310/626 |
| 5,225,770 A | * | 7/1993 | Montagu ..................... 324/146 |
| 5,424,632 A | | 6/1995 | Montagu ..................... 324/146 |
| 5,714,814 A | * | 2/1998 | Marioni ......................... 310/87 |
| 5,955,806 A | | 9/1999 | Devenyi |
| 6,172,439 B1 | * | 1/2001 | Ishuzuka ..................... 310/156 |
| 6,218,803 B1 | | 4/2001 | Montagu et al. ............ 318/662 |
| 6,265,794 B1 | | 7/2001 | DeBoalt ....................... 310/56 |
| 6,275,319 B1 | | 8/2001 | Gadhok ....................... 359/198 |
| 6,448,673 B1 | * | 9/2002 | Brown ......................... 310/17 |
| 6,528,909 B1 | * | 3/2003 | Kan ............................. 310/52 |

FOREIGN PATENT DOCUMENTS

EP 0609873 9/1999

OTHER PUBLICATIONS

Fleisher, William A.: "Brushless Motors for Limited Edition" Dec. 7, 1991 (1991–12–07), Machine Design, Penton, Inc. Cleveland, US, vol. 61, NR. 25, pp. 97–100 XP00085119 ISSN: 0024–9114 p. 97–page 98 p. 100; figures IN, p. 98.

* cited by examiner

Primary Examiner—Nicholas Ponomarenke
Assistant Examiner—Iraj A. Mohandesi
(74) Attorney, Agent, or Firm—Gauthier & Connors, LLP

(57) ABSTRACT

A limited rotation torque motor is disclosed that includes a rotor and a stator. The rotor includes a plurality of pairs of magnetic poles and the stator includes a plurality of pairs of stator coils. Each stator coils extends along a longitudinal length of the motor.

16 Claims, 9 Drawing Sheets

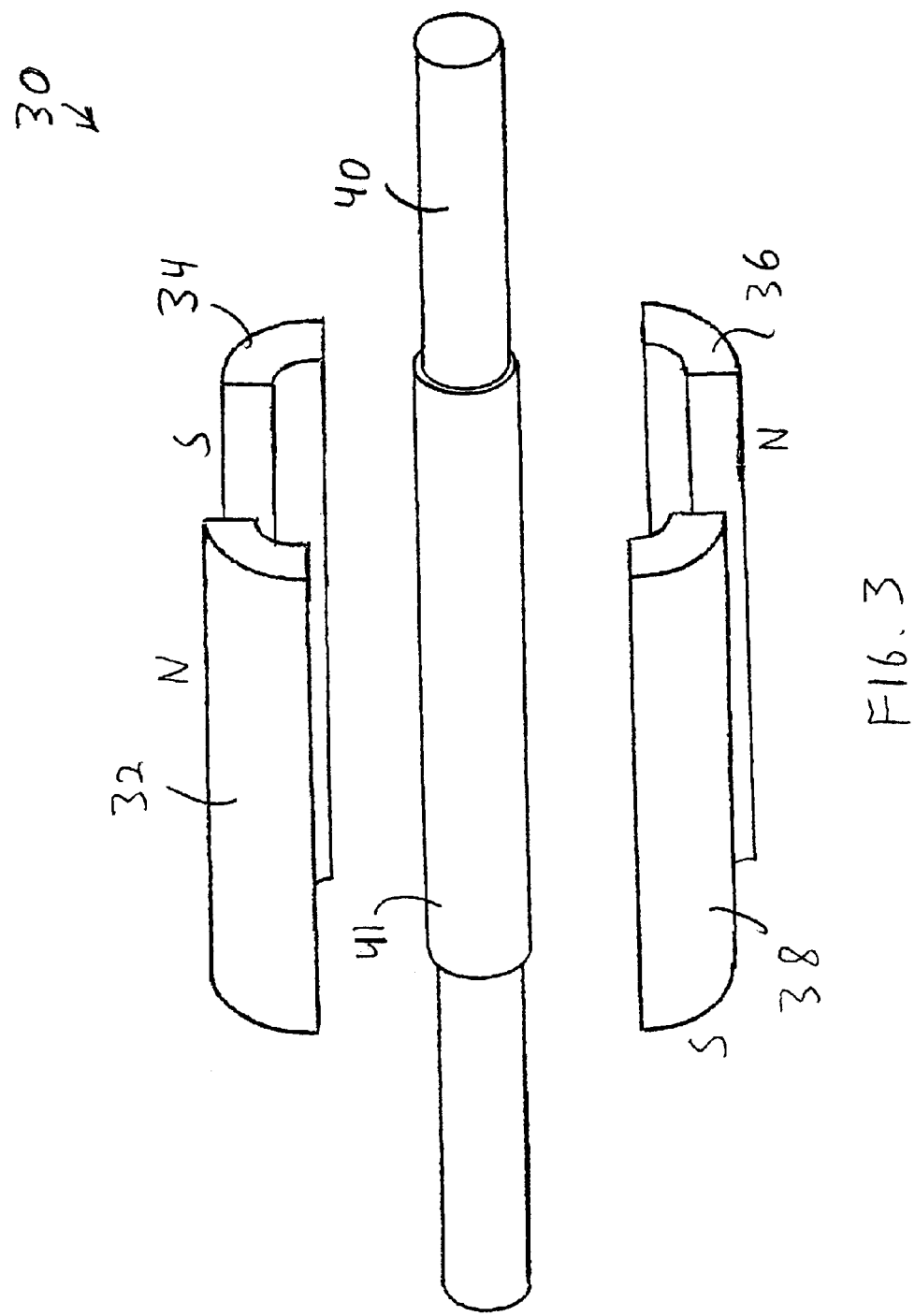

GALVANOMETER MOTOR WITH COMPOSITE ROTOR ASSEMBLY

BACKGROUND

The invention relates to limited rotation motors such as galvanometers, and particularly relates to limited rotation torque motors used to drive optical elements such as mirrors for the purpose of guiding light beams in scanners.

Limited rotation torque motors generally include stepper motors and galvanometer motors. Certain stepper motors are well suited for applications requiring high speed and high duty cycle sawtooth scanning at large scan angles. For example, U.S. Pat. No. 6,275,319 discloses an optical scanning device for raster scanning applications that includes a multi-pole moving magnet rotor and a stator formed of a large number of rings (laminations), each of which includes radially directed teeth having individual coils wound around the teeth.

Limited rotation torque motors for certain applications, however, require the rotor to move between two positions with a precise and constant velocity rather than by stepping and settling in a sawtooth fashion. Such applications require that the time needed to reach the constant velocity be as short as possible and that the amount of error in the achieved velocity be as small as possible. To achieve this, a very high torque constant must be provided by the motor requiring as high a flux density as possible. This generally requires that the number of coil turns in the gap between the rotor and the stator be maximized without increasing the size of the gap.

Galvanometer motors generally provide a higher torque constant and typically include a rotor and drive circuitry for causing the rotor to oscillate about a central axis, as well as a position transducer, e.g., a tachometer or a position sensor, and a feedback circuit coupled to the transducer that permits the rotor to be driven by the drive circuitry responsive to an input signal and a feedback signal. For example, U.S. Pat. No. 5,225,770 discloses a conventional two-pole galvanometer motor, which is described below and shown herein in FIGS. 1 and 2A–2C, labeled prior art. The two-pole galvanometer includes a solid magnetic rotor 10 that is captured between two end portions 12 and 14 that in turn are coupled to two shafts 16 and 18 as shown in FIG. 1. The rotor 10 is polarized into essentially two semi-cylindrical magnetic portions 6 and 8 having opposite magnetic polarity, e.g., N and S. As shown in FIGS. 2A–2C, a stator for use with the rotor 10 of FIG. 1 may include two stator coil portions 22 and 24 and a magnetically permeable stator housing or backiron 13. The coil portions 22, 24 are attached to the housing 13 and disposed on opposite sides of the rotor within an annular space or gap 11 formed between the housing 13 and the rotor 10 such that the rotor is free to rotate about the axis 20 while the stator remains stationary.

A shown in FIG. 2B the coil portions 22 and 24 subtend a half angle of $\alpha_0$. In conventional galvanometers, the half angle $\alpha_0$ limits the angle of rotation of the rotor, which is generally limited to about 23 degrees. As the rotor rotates, however, the rotor poles N & S rotate toward the coil portion half angles $\alpha_0$ such that a portion of each semi-cylindrical magnetic section 6 and 8 is facing open space 27 between the opposing coils. In this case, the system is said to be underhung meaning that in extreme rotational positions of the rotation of the rotor 10, part of the rotor 10 is not opposed by coil windings 22 and 24. Since an underhung system has fewer coil windings available to drive the rotor 10 at the extreme edges of rotor rotation, there is less torque available to drive the rotor 10 at the edges of the travel. This results in lower acceleration of the rotor 10 at precisely the regions where high acceleration is desirable. If the number of stator coils is increased to fill the open space 27 such that the coils extend circumferentially further than the magnetic sections, then the system is said to be overhung. Providing coils that are overhung also has a disadvantageous effect on rotor travel, compromising performance. In particular, the coil resistance is increased, which increases the heat that must be dissipated from the system. There is, therefore, an optimum number and configuration of stator coils that may be placed in the gap to drive the motor.

There are applications in which it is desirable to have greater torque than may be provided by conventional limited rotation torque motors. There is a need therefore, for limited rotation torque motors that provide improved flux density without adversely affecting the performance of the motor.

Another problem with conventional galvanometer systems is fringing. As shown in FIG. 2C, a plurality of flux lines 29 show the flux path of a conventional solid magnet two-pole galvanometer. Following the flux lines 29, a magnetic flux passes from the N pole of the solid magnetic rotor 10, across the gap 11 between the magnetic rotor 10 and a backiron 13, circumferentially around the backiron 13, across the gap 11 and a second time to the S pole of the solid magnet rotor 10 and then through the rotor returning to the N pole portion. As will be readily understood, the magnetic permeability of the magnetic portions 6 and 8 and the backiron 13 may be many thousands of times greater than the magnetic permeability of the air and copper of the coils windings (shown in FIG. 2B) that are present in the gap 11. Accordingly, there is a high reluctance or resistance to the flow of magnetic flux passing in the gap 11. As a result of the high reluctance in the gap 11, fringing occurs near the boundary 21 between the magnetic portions 6 and 8. This condition is shown in FIG. 2C wherein local flux lines 23 pass from one magnetic section to another without passing through the stator coil windings 22 and 24 shown in FIG. 2B. Accordingly, the magnetic portions 6 and 8 near the border 17 between the N and S portions of the magnetic rotor 10 do not contribute to generating torque for rotating the rotor 10. Since this flux never passes through a wire, it is lost to the torque-producing process. In fact, more than 15% of the magnetic volume near the equator is ineffective in producing torque for this reason, although it contributes excessively to the moment of inertia of the rotor since it is all positioned far from the axis of rotation. In spite of occupying 360 degrees of the rotor surface, only about 270 degrees of magnetic material is effective in producing torque. It has been discovered that there is a large volume of space inside the stator coils that contain no useful flux in a conventional two-pole rotor system.

SUMMARY OF THE INVENTION

A limited rotation torque motor is disclosed that includes a rotor and a stator. The rotor includes a plurality of pairs of magnetic poles and the stator includes a plurality of pairs of stator coils. Each stator coils extends along a longitudinal length of the motor. In an embodiment, the motor includes two pairs of permanent magnets providing two pairs of magnetic poles, and includes two pairs of stator coils.

BRIEF DESCRIPTION OF THE DRAWINGS

The following description may be further understood with reference to the accompanying drawings in which.

The drawings are shown for illustrative purposes and are not to scale.

DETAILED DESCRIPTION OF THE ILLUSTRATED EMBODIMENTS

Figure 4:
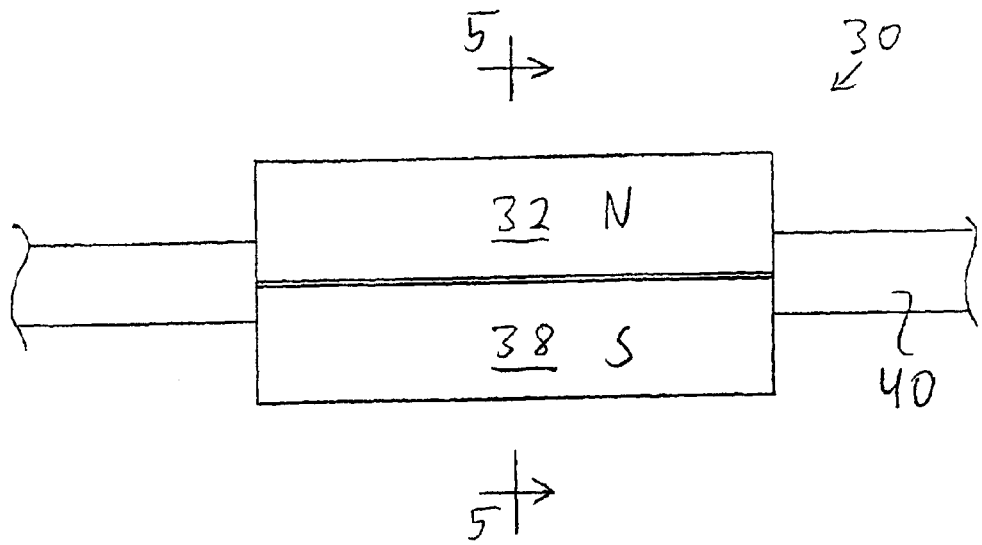
FIG. 4 shows an illustrative side view of the rotor assembly of FIG. 3.
Figure 5:
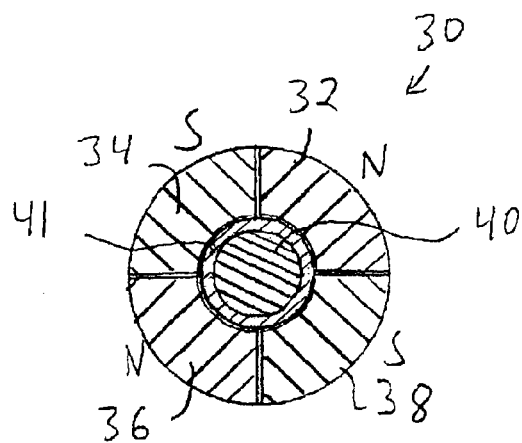
FIG. 5 shows an illustrative sectional view of the rotor assembly of FIG. 3 taken along line 5—5 of FIG. 4.
Figure 3:
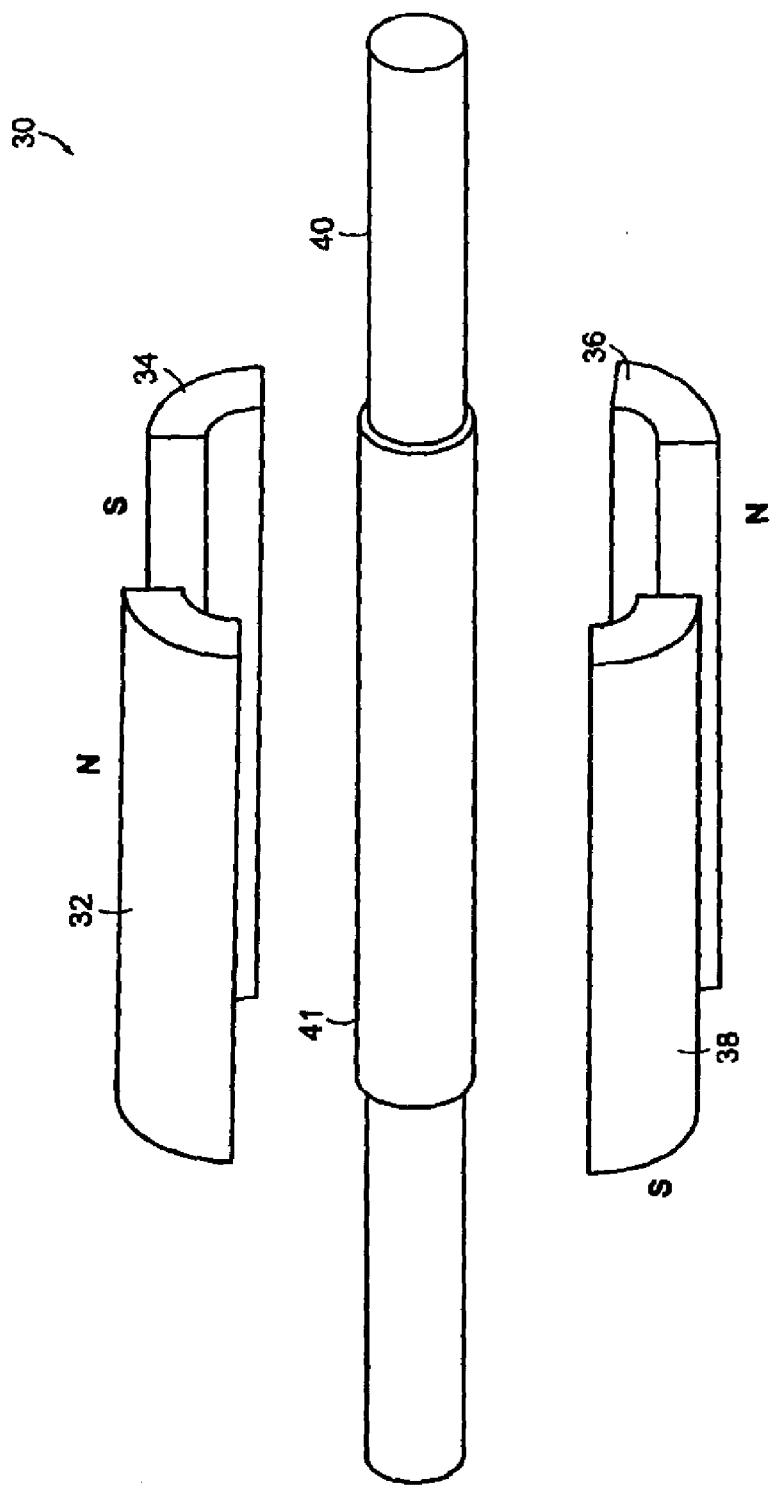
FIG. 3 shows an illustrative exploded view of a rotor assembly in accordance with an embodiment of the invention.
Figure 4:
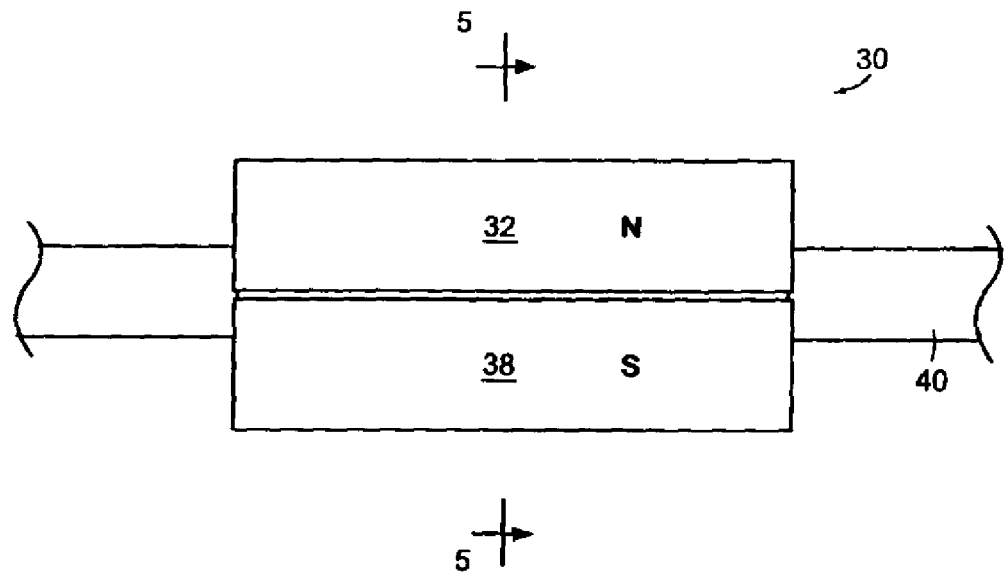
Figure 5:
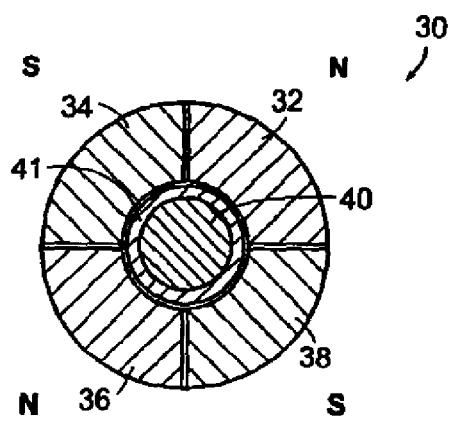
Figure 6:
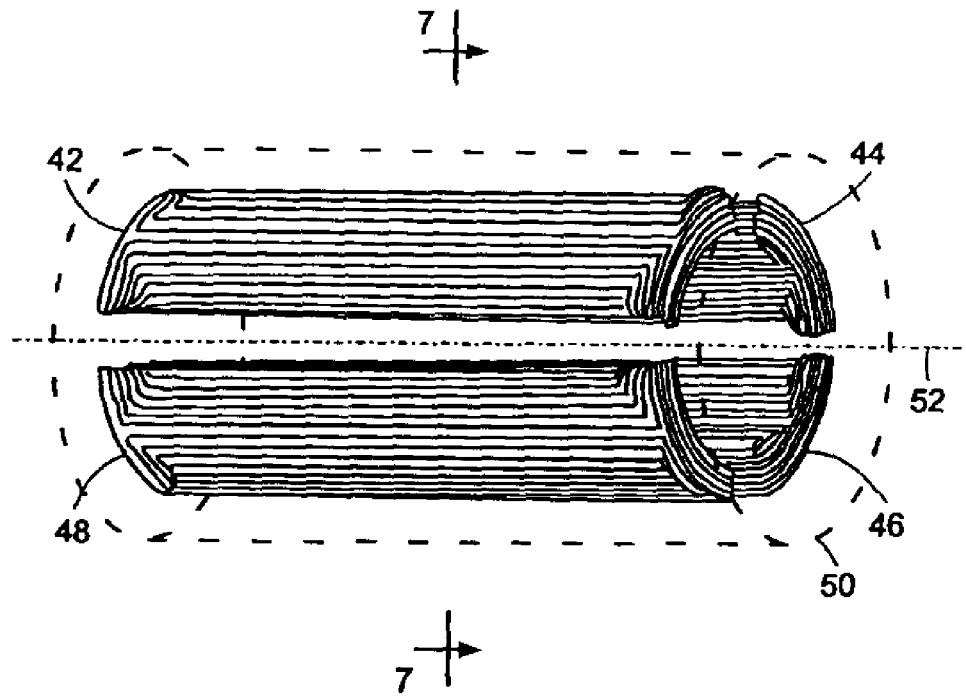
Figure 7:
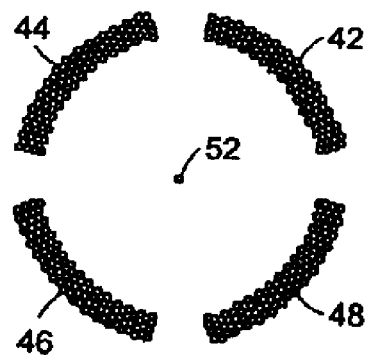
Figure 8A:
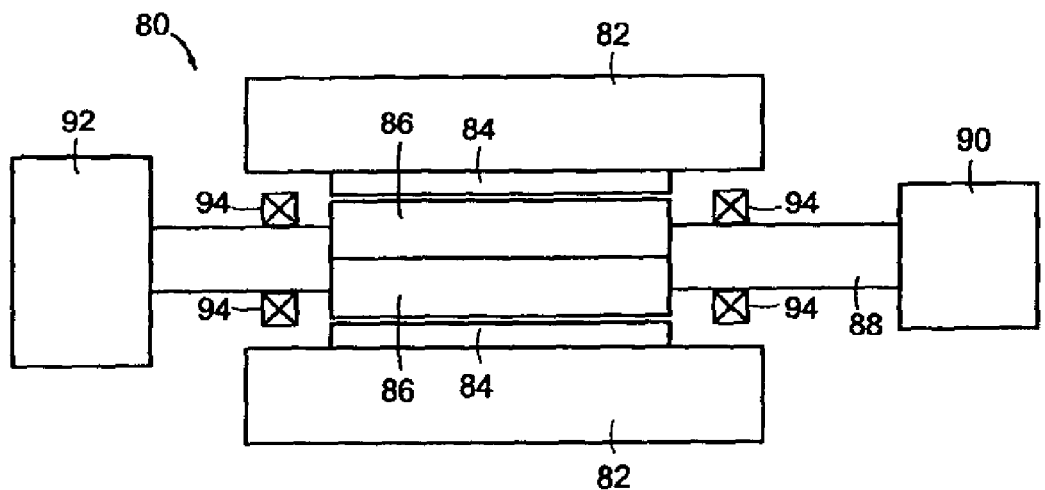
Figure 8B:
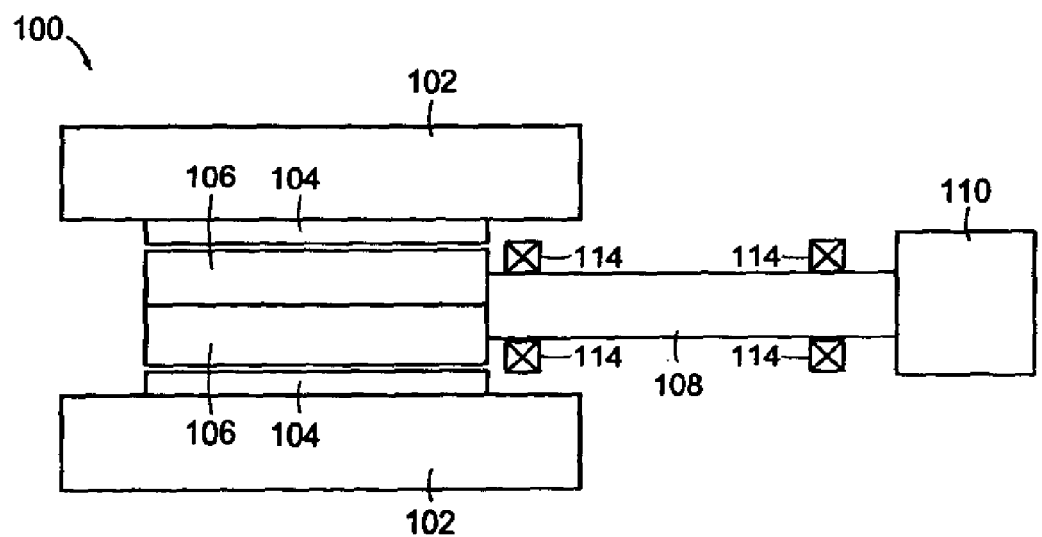
Figure 9:
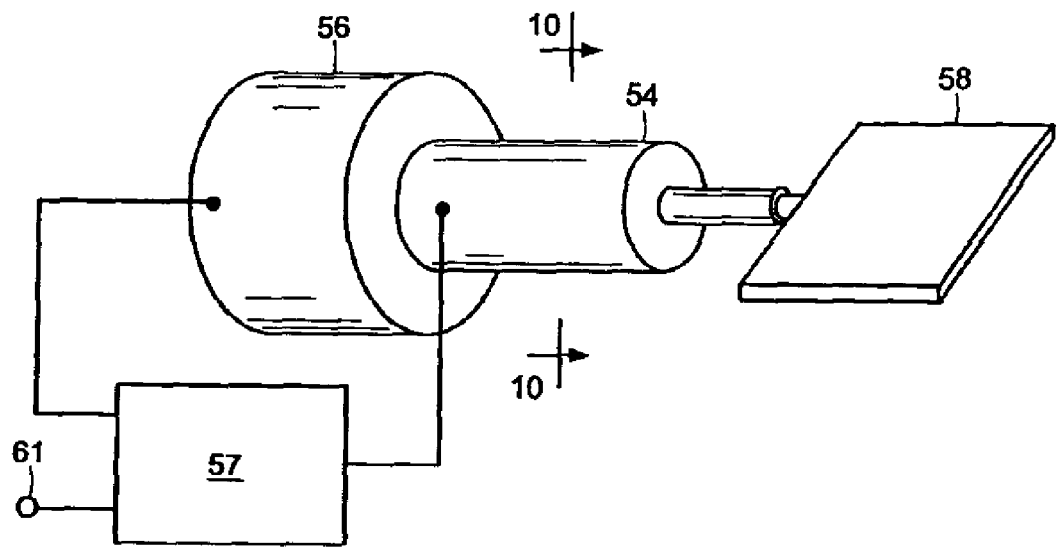
Figure 10:
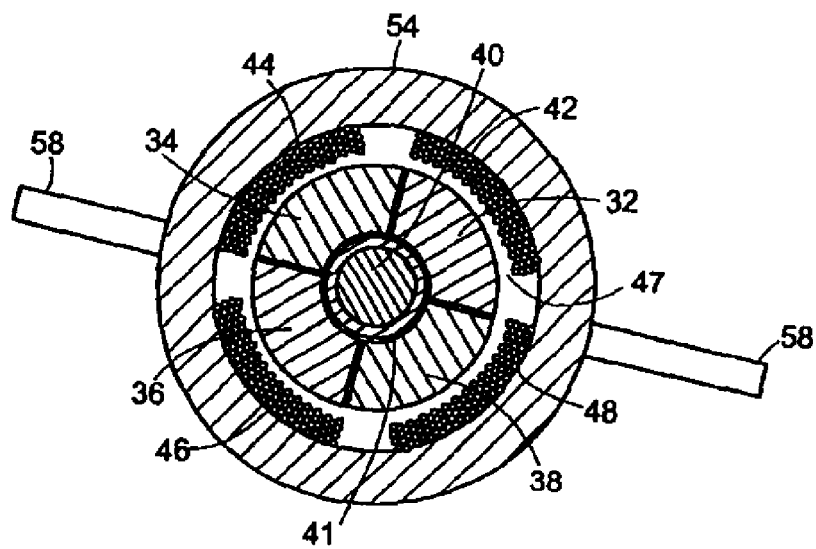
Figure 11:
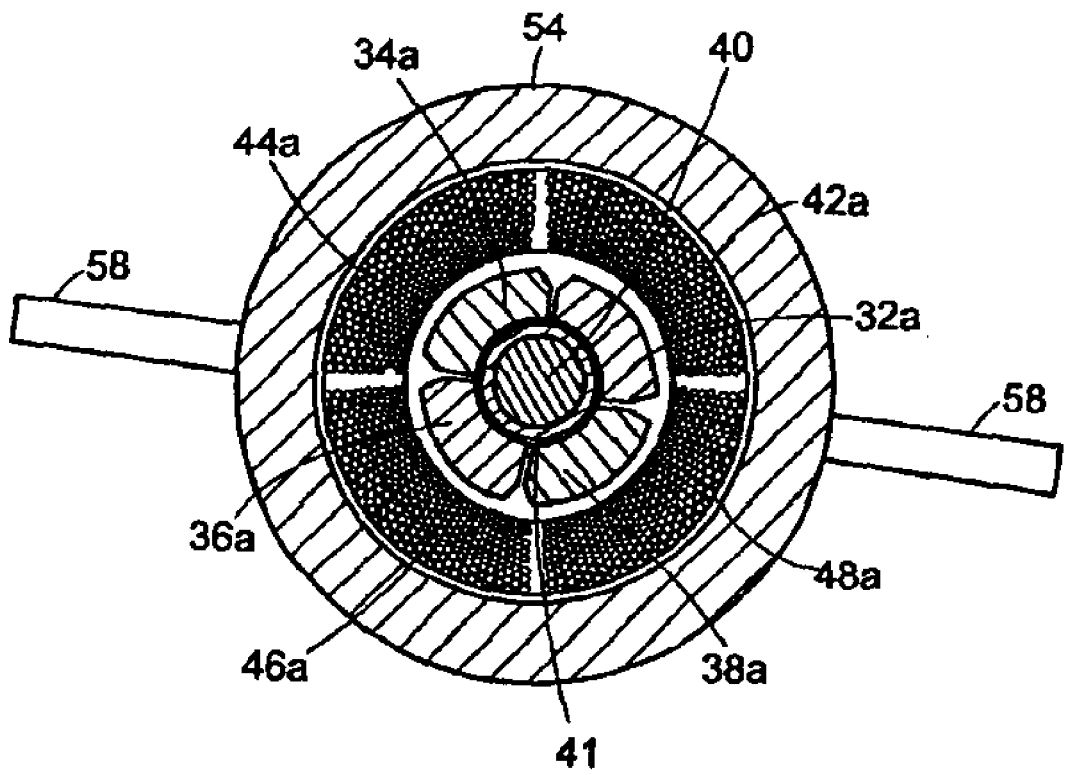
Figure 12:
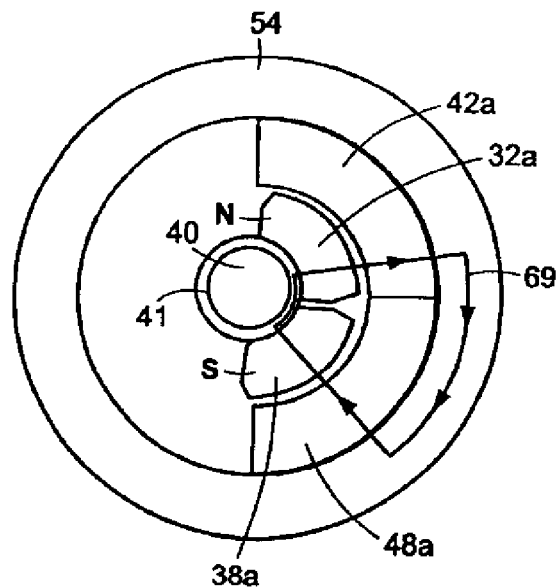
Figure 13:
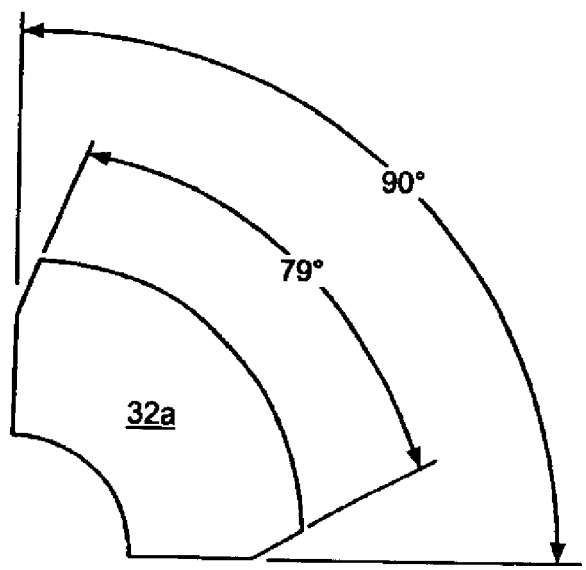

As shown in FIG. 3, a rotor 30 in accordance with an embodiment of the invention includes four magnetic segments 32, 34, 36 and 38, two of which (32 and 36) are N (north) pole magnets, and two of which (34 and 38) are S (south) pole magnets. The magnetic segments are fixed to a shaft 40 on which scanning elements (e.g., a mirror) may be mounted. In the embodiment shown in FIG. 3, the magnetic segments are bonded to a magnetically permeable sleeve 41 that is bonded to the shaft 40. The shaft 40 may be magnetically permeable or may be non-magnetically permeable, and may be formed from a solid material or may comprise a tube structure having a hollow center portion. The assembled rotor 30 is shown in FIGS. 4 and 5 such that opposing magnetic segments abut one another providing two pairs of magnetic poles. As will be described below, increasing the number of pole pairs increases the torque available for driving the rotor 30. In further embodiments, more pairs of poles (e.g., three or four pairs) may be provided to further increase the available torque. Further, because the shaft 40 may extend to the scanning elements, there is no need to include end portions such as 12 and 14 shown in FIG. 1, which reduces the inertia of the rotor 30 thereby increasing the amount of rotor acceleration achievable by applying a given torque. Also, the shaft 40 may be formed of any material such as a ceramic, beryllium, beryllium copper or titanium, which may provide increased stiffness in the rotor 40. The increased stiffness further offers opportunity to increase rotor acceleration without adverse effects such as torsional resonance. In addition, a stiffer material may have sufficient stiffness in a hollow configuration thereby further reducing the moment of inertia of the rotor and may not be magnetically permeable.

Figure 6:
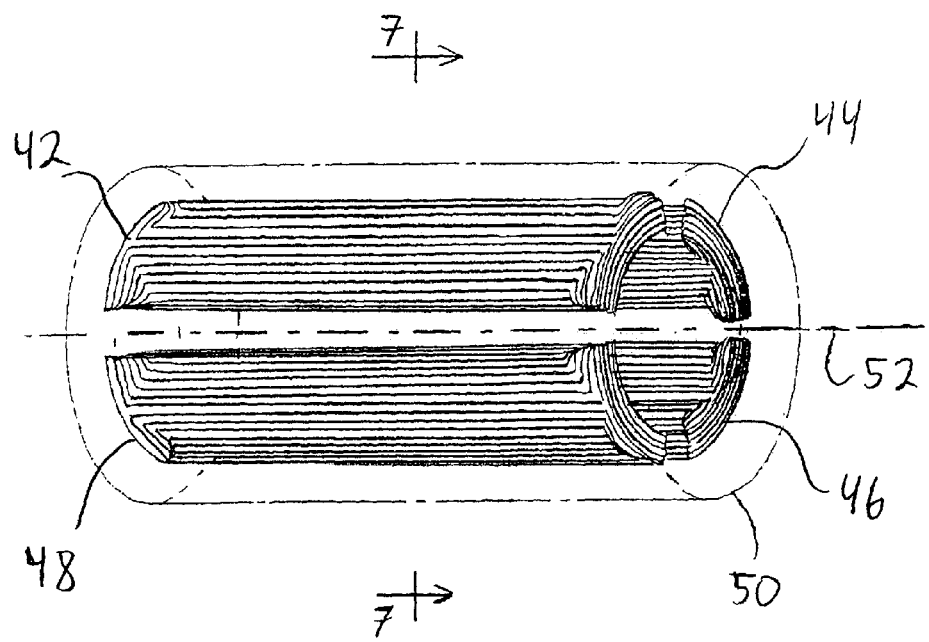
FIG. 6 shows an illustrative isometric view of stator coils for use with the rotor of FIG. 3.
Figure 7:
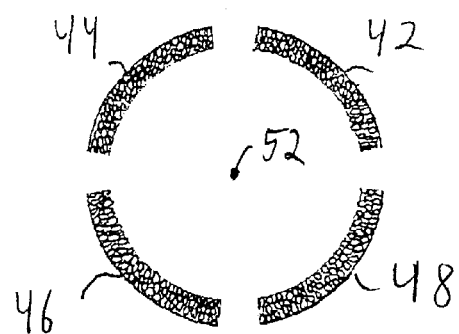
FIG. 7 shows an illustrative sectional view of the stator coils of FIG. 6 taken along line 7—7 thereof.

As shown in FIGS. 6 and 7, a stator for use with the rotor of FIGS. 3–5 may include four sets of shaped coil assemblies 42, 44, 46 and 48. Each of the coil assemblies may be formed of insulated wire that is first wound about a bobbin such as is disclosed in U.S. Pat. No. 5,225,770, the disclosure of which is hereby incorporated by reference. The coil assemblies are then removed from the bobbin, and the longitudinal sides of each winding are then pressed together in a compression mold to form a shaped coil assembly that is attached to a stator housing shown in dot dashed lines 50 in FIG. 6. According to the invention, the stator housing 50, or backiron, is preferably formed of a readily magnetically permeable material such as iron, nickel, cobalt or other ferromagnetic materials for providing a low reluctance flux path through the stator housing, as will be further detailed below. The coil assemblies 42, 44, 46 and 48 are substantially symmetrically positioned around an axial center 52 of the stator.

Figure 8A:
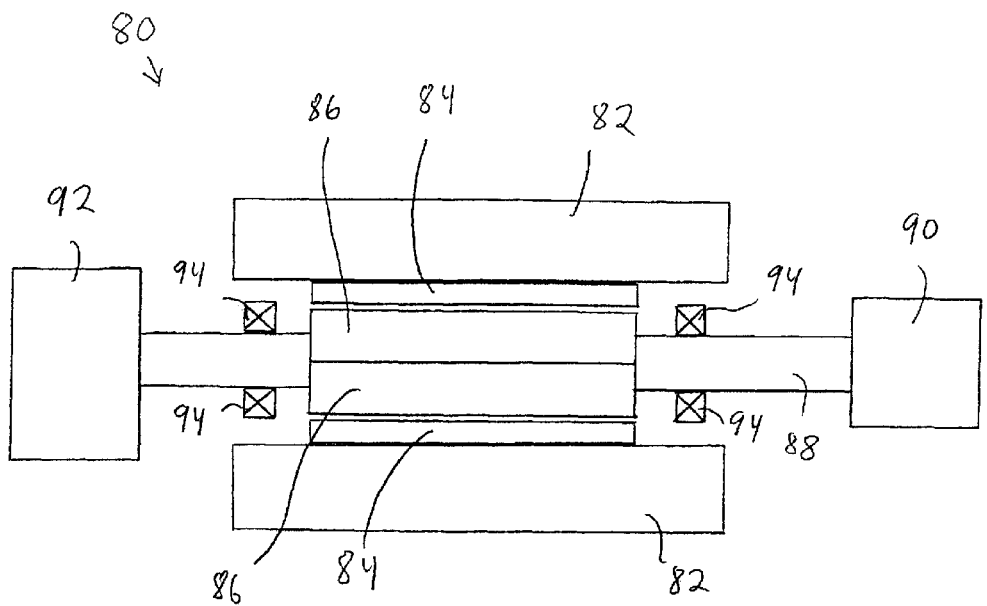
FIGS. 8A and 8B show illustrative sectional views of galvanometer scanner assemblies using galvanometer scanner motors of the invention.
Figure 8B:
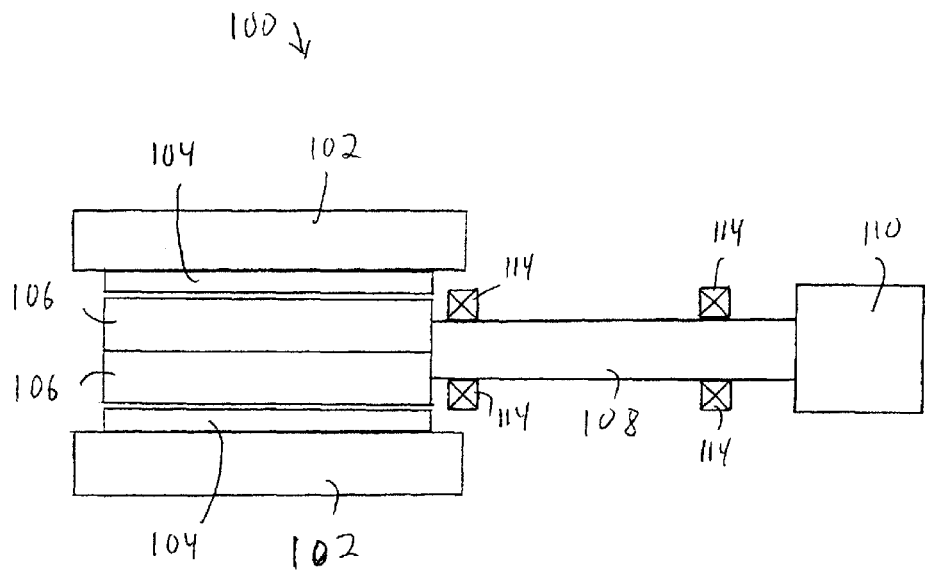

A galvanometer assembly 80 including a motor in accordance with an embodiment of the invention includes a backiron 82, stator coils 84 and magnetic segments 86 that are secured to a shaft 88 as shown in FIG. 8A. The shaft 88 is rotatably mounted to a housing structure (not shown) via bearings 94. A scanner element such as a mirror 90 is mounted to one end of the shaft 88 while a position transducer 92 is mounted to the other end of the shaft 88. As shown in FIG. 8B, a galvanomter assembly 100 including a motor in accordance with an embodiment of the invention includes a backiron 102, stator coils 104 and magnetic segments 106 that are secured to a, shaft 108. A mirror 110 is attached to the shaft and the shaft is rotatably secured to a hosuing structure (not shown) via bearings 114. The galvanometer assembly 100 may further include a position transducer.

Figure 9:
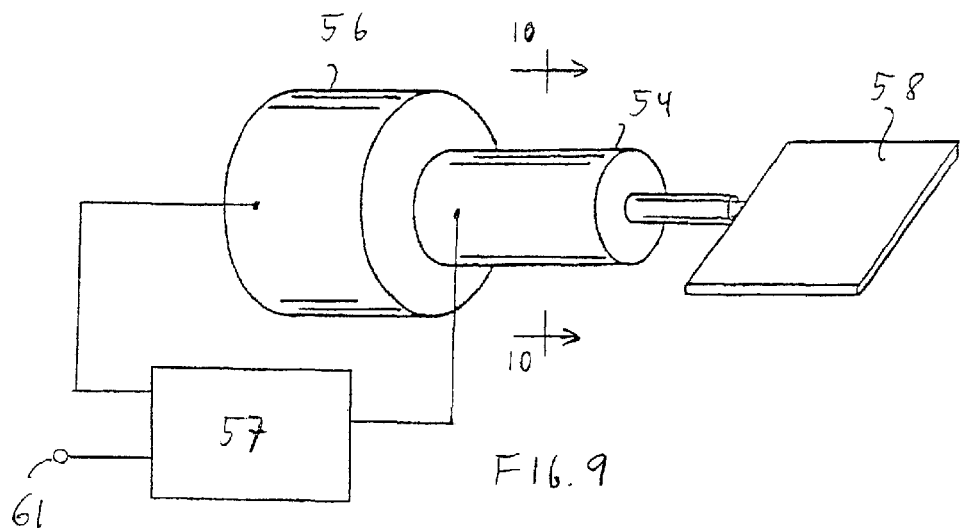
FIG. 9 shows an illustrative isometric view of a galvanometer scanner assembly and mirror in accordance with an embodiment of the invention.

The position transducer provides position feedback during operation. In particular, as shown in FIG. 9, a galvanometer scanner assembly including a scanner motor system in accordance with an embodiment of the invention includes a scanner motor 54, having a rotatable rotor 30, like the rotor of FIGS. 4 and 5 with a position transducer 56 for monitoring the position of the rotor 30 attached to one end of the rotor and a scanning element 58, which may comprise a mirror, attached to the output shaft of the scanner motor 54 at an opposite end from the position transducer. Of course, the scanning element 58 and the position transducer 56 may each be attached to the rotor at the same end thereof.

The motor 54 includes stator coils 42, 44, 46 and 48 for driving the rotor 30. Each stator coil 42, 44, 46 and 48 may be driven by a separate coil current issued by a servo controller 57 or opposing coils, e.g., 42 and 46, may be connected in series or in parallel and drive by the same current issued by the servo controller 57. A rotor angular position feedback signal from the position transducer 56 is delivered to the servo controller 57 to provide information about the instantaneous angular position of the rotor 30. Alternately, or additionally, a rotor velocity sensor (not shown) may also be used to monitor the instantaneous angular velocity of the rotor 30 and feed an instantaneous velocity signal back to the servo controller 57. Additionally, the servo controller 57 may receive an input command 61 from another device such as a computer or processor (not shown). The input command 61 may represent a desired angular position or a desired angular velocity of the scanning element or both position and velocity.

Figure 10:
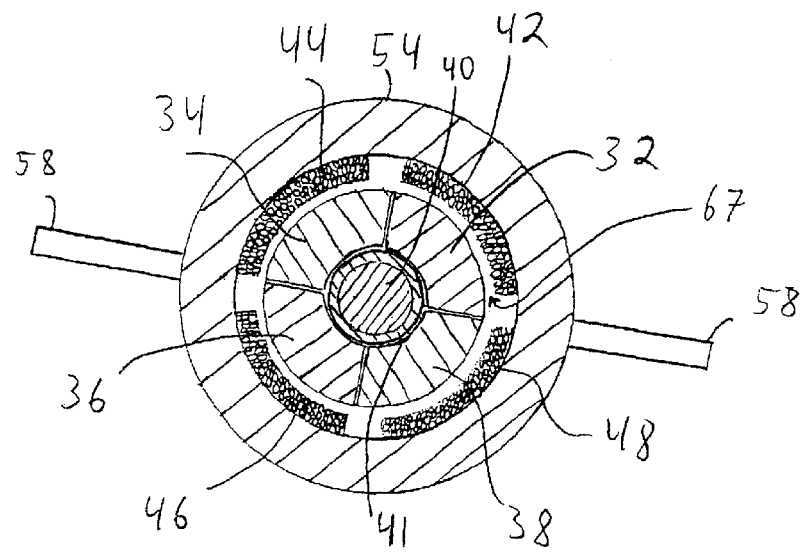
FIG. 10 shows an illustrative sectional view of the galvanometer scanner motor of FIG. 8 taken along line 10—10 thereof.

As shown in FIG. 10, the motor 54 includes the magnetic rotor segments 32, 34, 36 and 38 of FIGS. 3–5 as well as the shaped coil assemblies 42, 44, 46 and 48 of FIGS. 6 and 7. The coil assemblies are fixedly attached to a magnetically permeable housing or backiron 54. The rotor 30 is positioned within the coil assemblies and the housing 54 with a substantially uniform gap 67 surrounding the rotor 30. The rotor 30 is suspended, e.g., by bearings, within gap 67 and is free to rotate about its center axis. According to the invention, the motor 54 provides improved magnetic flux density in the gap 67. In addition, the invention increases the density of coil winding in the gap 67. This improved magnetic flux density and coil winding density leads to increasing the available torque for driving the rotor 30. And, as is stated above, the geometry of the shaft 40 may decrease the inertia of the rotor 30 thereby increasing rotor acceleration achievable at a given torque. The result is a significant increase in torque to inertia ratio providing a limited rotation torque motor that can be more quickly accelerated to a constant velocity and exhibits a velocity having reduced variations or ripple.

In particular, magnetic flux will flow in a path that has the lowest possible total reluctance (or resistance to magnetic flux). Non-ferromagnetic materials (e.g., air and copper in the coil windings in the gap 67) have substantially the same relatively high reluctance compared with the ferromagnetic permanent magnet segments 32, 34, 36 and 38 of the rotor 30, and the ferromagnetic permanent magnet segments 32, 34, 36 and 38 of the rotor 30, and the ferromagnetic housing or backiron 54. In fact, reluctance in ferromagnetic materials may be several thousand times lower than reluctance in non-ferromagnetic materials. As a result, magnetic flux will flow in the shortest possible path from one magnetic pole, e.g., N, to an adjacent opposite pole, e.g., S, by the path of least reluctance. In galvanometer motors, it is important to generate a high flux density across the gap 67 and to utilize as much flux as possible for good motor performance.

Figure 11:
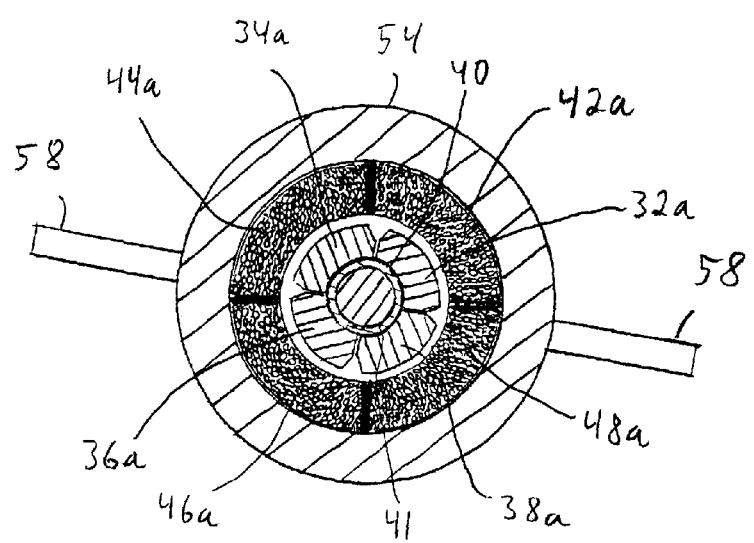
FIG. 11 shows an illustrative sectional view similar to that shown in FIG. 10 of a galvanometer scanner motor in accordance with a further embodiment of the invention.
Figure 13:
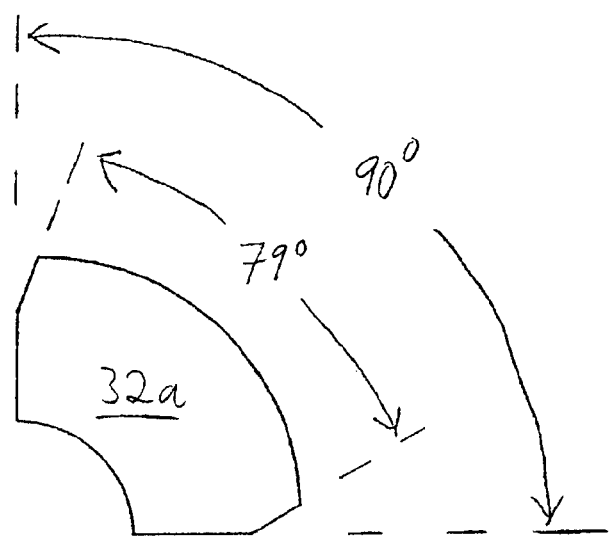
FIG. 13 shows an illustrative diagrammatic view of a magnetic segment used in the motor of FIG. 11.
Figure 1:
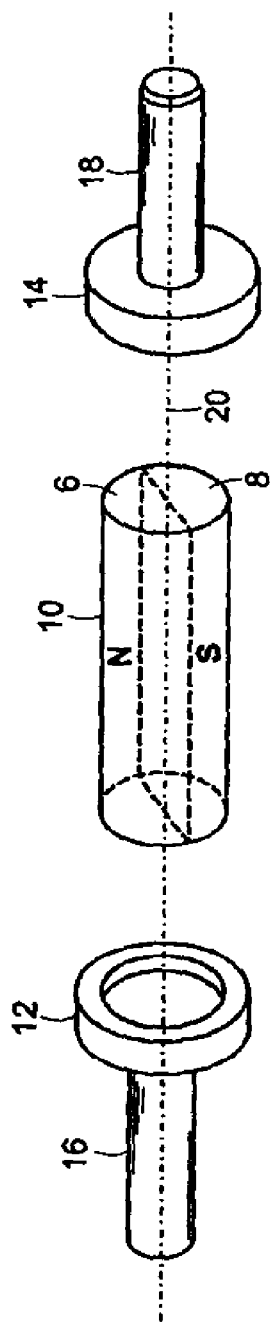
Figure 2A:
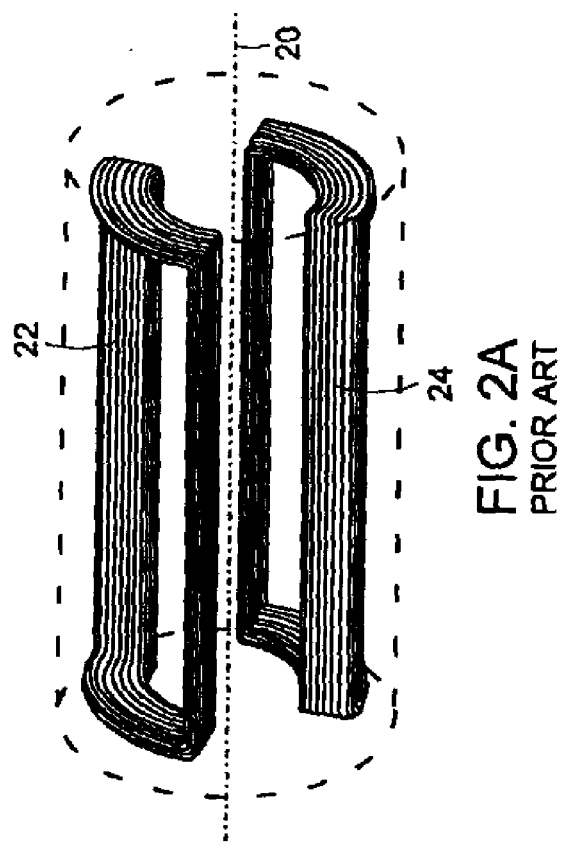
Figure 2B:
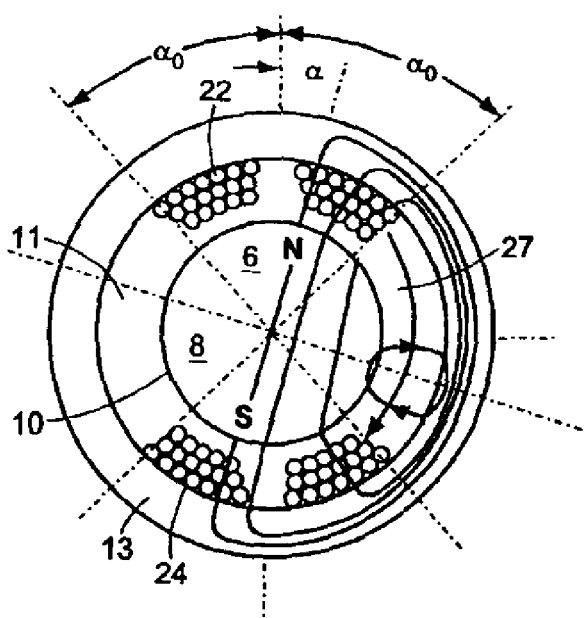
Figure 2C:
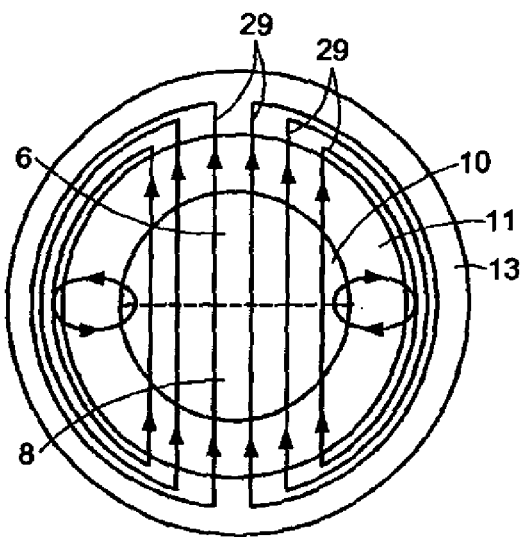

FIG. 11 shows a cross-sectional view of a four-pole galvanometer structure in accordance with a further embodiment of the invention that more effectively uses the volume of space in the motor to produce additional torque. The four coil assemblies 42a, 44a, 46a, 48a entirely fill the volume between the rotor and the stator interior (except for clearance for rotor rotation). The four magnet segments 32a, 34a, 36a, 38a taken together have an effective angular subtense of 270 degrees (360 degrees–4×22.5 degrees of mechanical rotation). As a further improvement, the tips of the magnet sectors 32a, 34a, 36a, 38a are cut back or beveled at their outer surfaces, near the boundaries between sectors thereby producing a focusing effect that causes the flux from 90 degrees of magnet segment, e.g., 32a, to pass through 79 degrees of pole. This is shown in FIG. 13. This improvement increases the flux density in the gap 67 by 15%. In addition, since the magnet sections are always opposed to a coil section throughout the rotational angle of the rotor 30, substantially all fringing flux passes through wire of the coil winding such that even the fringing flux contributes to generating torque in the motor. In addition, the total flux path length is on average, only 50% as great as the flux path in a two-pole device because the poles are only 90 degree apart instead of 180 degrees apart. Finally, assuming the same packing density as in conventional two-pole galvanometers, 33% more wire will fit in the four-pole configuration of the present invention.

Figure 12:
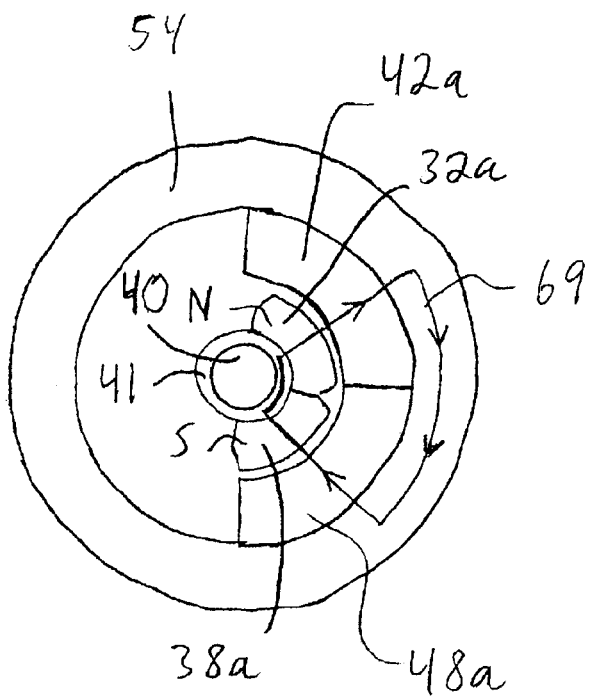
FIG. 12 shows an illustrative sectional view through the motor of FIG. 11 showing illustrative lines of flux.

An improved magnetic flux path for one half of a motor according to the present invention is shown in FIG. 12. Magnetic flux generated by the permanent magnets 32a and 38a is shown by the flux lines 69 in FIG. 12. The magnetic flux flows from, for example the N pole of magnet 32a, across the gap 67 to the backiron 54, along a circumferential path in the backiron 54, across the gap 67, a second time, to the S pole of magnet 38a and then through the magnetic section 38a and the magnetically permeable sleeve 41 to the magnetic section 32a. In addition to the magnetic flux generated by the magnetic sections 32a and 38a, a current passing through the coils 42a and 48a generated by the magnetic sections 32a and 38a, a current passing through the coils 42a and 48a generates a separate and controllable magnetic flux that is used to act on the magnetic sections 32a and 38a to generate a rotation torque for rotating the rotor 30 in a desired manner. According to the present invention, more torque may be utilized for driving the rotor because there is a more efficient use of magnetic material on the rotor 30 and a more efficient use of coil windings in the stator.

Figure 1:
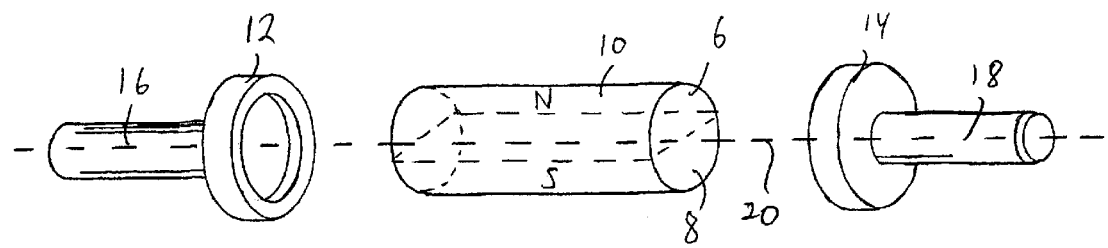
FIG. 1 shows an illustrative exploded view of a prior art rotor assembly for use in a galvanometer scanner.
Figure 2A:
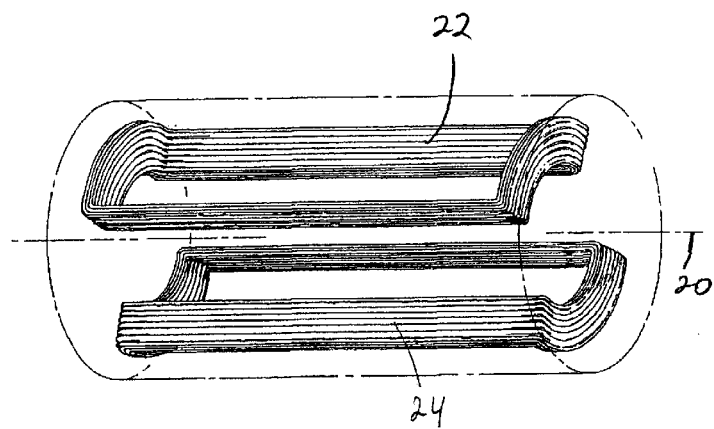
FIG. 2A shows an illustrative isometric view of a pair of prior art stator coils for use with the rotor of FIG. 1.
Figure 2B:
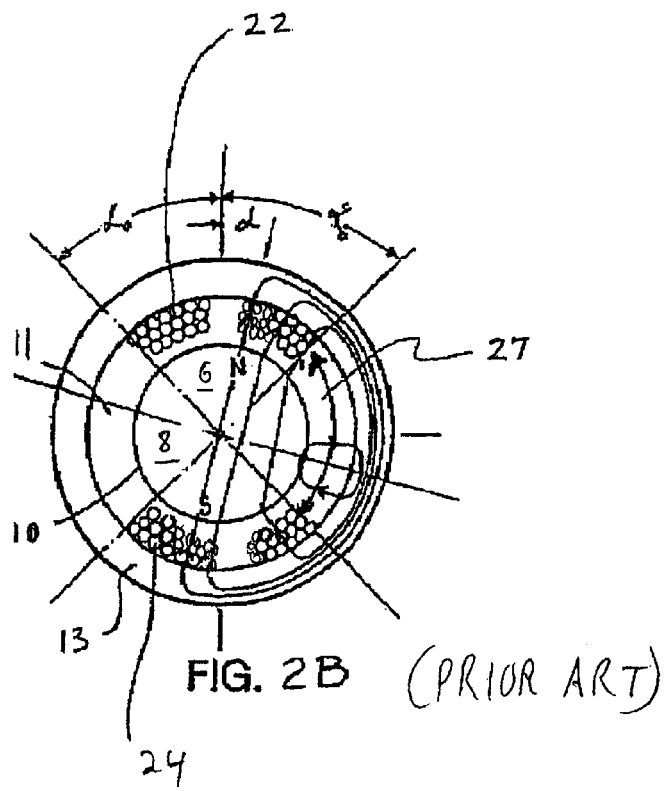
FIG. 2B shows an illustrative sectional view through a conventional solid magnet two-pole galvanometer.
Figure 2C:
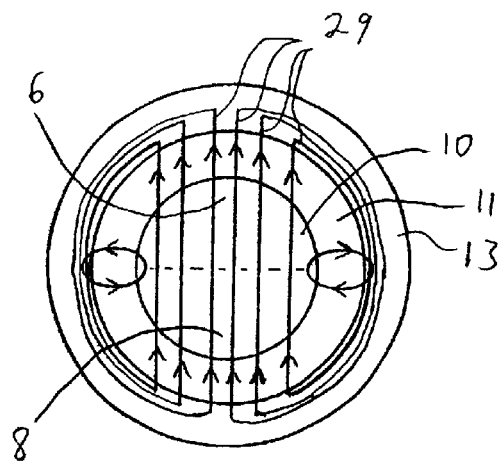
FIG. 2C shows an illustrative sectional view through a conventional solid magnet two-pole galvanometer showing illustrative lines of magnetic flux.

In a simple symmetric geometry such as the one shown in FIG. 1, the torque of the rotor is obtained by calculating the force on a single conductor, and integrating over the number of conductors, assuming an average flux density in the gap and an average radius of the conductor from the axis of rotation. The force, in grams, on a conductor is given by $$F=(6.59BLI)/10^4$$

where B is the average flux density in the gap 67, in units of Gauss, about=2500, L is the length of a conductor, in centimeters, about=3.0 cm, and I is the current, in Amperes (use 1=ampere for simplicity). Solving with these values, the force per conductor is 4.94 grams per Ampere.

For the four-pole motor of the present invention, where the flux density in the gap 67 is 15% higher, the force on a conductor is 5.68 grams per Ampere. Assuming the same average radius of the conductors, 0.8 cm, the torque per conductor in the prior art two-pole motor is 3.95 gm-cm per Ampere, and for the four-pole case it is 4.55 gm-cm per Ampere. With 125 conductors, the prior art two-pole galvanometer thus has a torque constant of 494 gm-cm per ampere. The four-pole galvanometer can fit 166 conductors, and the torque per conductor is 4.55 gm-cm per ampere, so the four-pole galvanometer produces a torque constant of 755 gm-cm per ampere, or more than 50% more torque. The torque constant is preferably greater than 700 gm-cm per ampere.

A conventional two-pole rotor of the prior art is a solid cylinder of permanent magnet 5 cm long and 1 cm in diameter. With a density of 6.0 gm/cm$^3$, it has a moment of inertia of 2.95 gm-cm$^2$. The four-pole rotor of the present invention replaces the central 0.4 cm of the magnet cylinder with a hollow ceramic cylinder whose moment of inertia is 0.14 gm-cm$^2$. The magnet assembly itself, because of the focusing notches, has a moment of inertia of 2.25 gm-cm$^2$. Adding these together, we have a rotor moment of inertia of 2.39 gm-cm$^2$.

One of the significant figures of merit for a galvanometer is the torque to inertia ratio, because a larger ratio allows faster acceleration and settling. In the case of a prior art two-pole motor, the ratio is 494 gm-cm per amp divided by 2.95 gm-cm$^2$, yielding a figure of merit of 167, while the four-pole configuration yields 775/2.39=324, a 94% better figure of merit. The torque to inertia ratio is preferably greater than 200 and in certain embodiments is more preferably greater than 300.

Those skilled in the art will appreciate that numerous modifications and variations may be made to the above disclosed embodiments without departing from the spirit and scope of the invention.

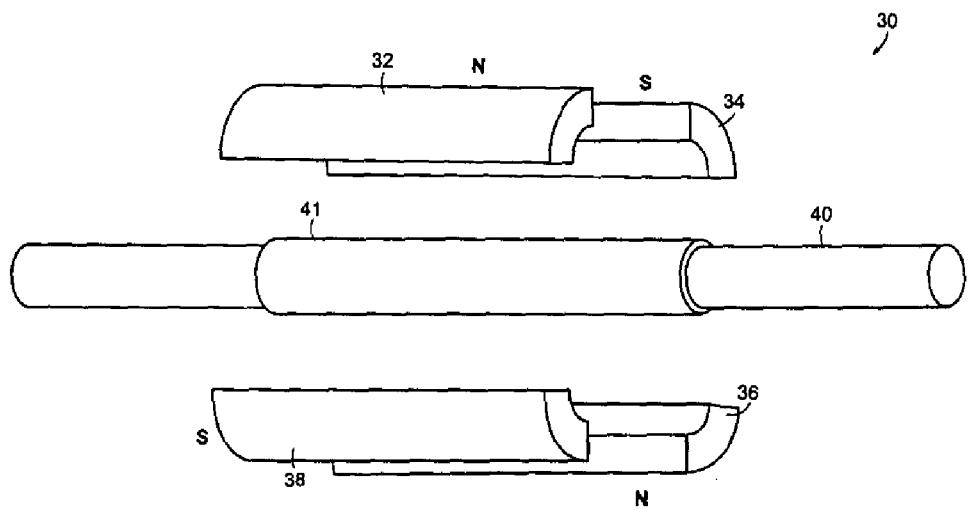

What is claimed is:

1. A galvanometer scanner motor comprising:
   a shaft for receiving an optical element for use in a scanner;
   a plurality of pairs of permanent magnets that are coupled to said shaft;
   a magnetically permeable housing for providing a circumferential flux path around the rotor; and
   a plurality of pairs of coils that are attached to the housing and extend along a longitudinal length of said motor for driving said plurality of pairs of permanent magnets for rotation with respect to the housing, said motor providing a flux density of at least about 2500 Gauss between said plurality of pairs of permanent magnets and said plurality of pairs of coils.

2. A galvanometer scanner motor as claimed in claim 1, wherein said motor has a torque to inertia ratio of at least 200.

3. A galvanometer scanner motor as claimed in claim 1, wherein said motor has a torque to inertia ratio of at least 300.

4. A galvanometer scanner motor as claimed in claim 1, wherein said plurality of pairs of coils abut one another encircling said two pairs of permanent magnets.

5. A galvanometer scanner motor as claimed in claim 1, wherein said motor provides a torque constant of at least 700 gm-cm per ampere.

6. A galvanometer scanner motor as claimed in claim 1, wherein the shaft comprises a substantially hollow tube.

7. A galvanometer scanner motor including
   a shaft,
   a plurality of pairs of permanent magnets fixed to said shaft, and
   a plurality of coil assemblies that extend along a longitudinal length of the scanner motor for receiving a current therein to impart a rotational torque to the rotor, wherein said plurality of pairs of permanent magnets abut one another and encircle said shaft forming a continuous outer circumference adjacent said plurality of coil assemblies.

8. A galvanometer scanner motor as claimed in claim 7, wherein said motor includes two pairs of permanent magnets and two pairs of coil assemblies.

9. A galvanometer scanner motor including
   a shaft,
   a plurality of pairs of permanent magnets fixed to said shaft, and
   a plurality of coil assemblies that extend along a longitudinal length of the scanner motor for receiving a current therein to impart a rotational torque to the rotor, wherein each said permanent magnet is shaped to direct a first angular range of lines of flux from a magnetic pole to one of said coil assemblies within a second angular range of lines of flux wherein said second angular range is less than said first angular range.

10. A galvanometer scanner motor as claimed in claim 9, wherein said motor includes two pairs of permanent magnets and two pairs of coil assemblies, and wherein said first angular range is about 90 degrees and said second angular range is less than about 80 degrees.

11. A limited rotation torque motor comprising:
    a rotor including a plurality of pairs of magnetic poles, a substantially non-magnetic shaft, and a magnetically permeable sleeve between said non-magnetically permeable shaft and said plurality of pairs of magnetic poles; and
    a stator including a plurality of pairs of stator coils, said stator coils extending along a longitudinal length of the motor.

12. A limited rotation torque motor as claimed in claim 11, wherein said shaft is formed of a material characterized as having stiffness properties that are at least equivalent to ceramic or beryllium.

13. A limited rotation torque motor as claimed in claim 11, wherein said rotor includes two pairs of magnetic poles, and said stator includes two pairs of stator coils.

14. A limited rotation torque motor comprising:
    a rotor including a plurality of pairs of magnetic poles and
    a stator including a plurality of pairs of stator coils that abut one another encircling said plurality of pairs of magnetic poles, said stator coils extending along a longitudinal length of the motor.

15. A limited rotation torque motor as claimed in claim 14, wherein said shaft is formed of a material characterized as having stiffness properties that are at least equivalent to ceramic or beryllium.

16. A limited rotation torque motor as claimed in claim 14, wherein said rotor includes two pairs of magnetic poles and said stator includes two pairs of stator coils.

* * * * *

UNITED STATES PATENT AND TRADEMARK OFFICE
CERTIFICATE OF CORRECTION

| | | |
|---|---|---|
| PATENT NO. | : 6,809,451 B1 | |
| DATED | : October 26, 2004 | |
| INVENTOR(S) | : David C. Brown | |

It is certified that error appears in the above-identified patent and that said Letters Patent is hereby corrected as shown below:

The title page showing the illustrated figure should be deleted and replaced with the attached title page.

Replace sheets 1-9 of the drawings with the attached sheets 1-9.

Signed and Sealed this

First Day of February, 2005

JON W. DUDAS
*Director of the United States Patent and Trademark Office*

(12) United States Patent
Brown

(10) Patent No.: US 6,809,451 B1
(45) Date of Patent: Oct. 26, 2004

(54) GALVANOMETER MOTOR WITH COMPOSITE ROTOR ASSEMBLY

(75) Inventor: David C. Brown, Northborough, MA (US)

(73) Assignee: GSI Lumonics Corporation, Billerica, MA (US)

(*) Notice: Subject to any disclaimer, the term of this patent is extended or adjusted under 35 U.S.C. 154(b) by 0 days.

(21) Appl. No.: 10/218,287

(22) Filed: Aug. 14, 2002

(51) Int. Cl.⁷ .................................................. H02K 21/12
(52) U.S. Cl. ............. 310/156.08; 310/156; 310/156.11; 310/154.31; 310/36
(58) Field of Search ..................... 310/156.08, 156.11, 310/36, 51

(56) References Cited

U.S. PATENT DOCUMENTS

| | | | |
|---|---|---|---|
| 1,271,441 A | * 7/1918 | Dean | |
| 4,076,998 A | 2/1978 | Montagu | 310/25 |
| 4,266,152 A | * 5/1981 | Herr | 310/59 |
| 4,533,891 A | 8/1985 | Vanderlaan et al. | |
| 5,105,139 A | * 4/1992 | Lissack | 310/626 |
| 5,225,770 A | * 7/1993 | Montagu | 324/146 |
| 5,424,632 A | 6/1995 | Montagu | 324/146 |
| 5,714,814 A | * 2/1998 | Marioni | 310/87 |
| 5,955,806 A | 9/1999 | Devenyi | |
| 6,172,439 B1 | * 1/2001 | Ishuzuka | 310/156 |
| 6,218,803 B1 | 4/2001 | Montagu et al. | 318/662 |
| 6,265,794 B1 | 7/2001 | DeBoalt | 310/56 |
| 6,275,319 B1 | 8/2001 | Gadhok | 359/198 |
| 6,448,673 B1 | * 9/2002 | Brown | 310/17 |
| 6,528,909 B1 | * 3/2003 | Kan | 310/52 |

FOREIGN PATENT DOCUMENTS

EP 0609873 9/1999

OTHER PUBLICATIONS

Fleisher, William A.: "Brushless Motors for Limited Edition" Dec. 7, 1991 (1991-12-07), Machine Design, Penton, Inc. Cleveland, US, vol. 61, NR. 25, pp. 97–100 XP00085119 ISSN: 0024-9114 p. 97–page 98 p. 100; figures IN, p. 98.

* cited by examiner

*Primary Examiner*—Nicholas Ponomarenke
*Assistant Examiner*—Iraj A. Mohandesi
(74) *Attorney, Agent, or Firm*—Gauthier & Connors, LLP

(57) ABSTRACT

A limited rotation torque motor is disclosed that includes a rotor and a stator. The rotor includes a plurality of pairs of magnetic poles and the stator includes a plurality of pairs of stator coils. Each stator coils extends along a longitudinal length of the motor.

16 Claims, 9 Drawing Sheets